Nov. 22, 1955 M. WATTER 2,724,347
BEDROOM ACCOMMODATIONS FOR PASSENGER VEHICLES
Filed Jan. 5, 1952 4 Sheets-Sheet 1

INVENTOR.
Michael Watter
BY
Maurice A. Crews
ATTORNEY

Nov. 22, 1955     M. WATTER     2,724,347
BEDROOM ACCOMMODATIONS FOR PASSENGER VEHICLES
Filed Jan. 5, 1952     4 Sheets-Sheet 2

INVENTOR.
BY Michael Watter
Maurice A. Crews
ATTORNEY

Nov. 22, 1955  M. WATTER  2,724,347
BEDROOM ACCOMMODATIONS FOR PASSENGER VEHICLES
Filed Jan. 5, 1952  4 Sheets-Sheet 3

INVENTOR.
Michael Watter
BY
Maurice A. Crews
ATTORNEY

Nov. 22, 1955 M. WATTER 2,724,347
BEDROOM ACCOMMODATIONS FOR PASSENGER VEHICLES
Filed Jan. 5, 1952 4 Sheets-Sheet 4

INVENTOR.
Michael Watter
BY
Maurice A. Crews
ATTORNEY

United States Patent Office 2,724,347
Patented Nov. 22, 1955

2,724,347

BEDROOM ACCOMMODATIONS FOR PASSENGER VEHICLES

Michael Watter, Philadelphia, Pa., assignor to The Budd Company, Philadelphia, Pa., a corporation of Pennsylvania Application January 5, 1952, Serial No. 265,086

7 Claims. (Cl. 105—315)

This invention relates to bedroom accommodations for passenger vehicles and has for an object the provision of improvements in this art.

One of the particular objects of the invention is to provide bedroom accommodations for a passenger vehicle which furnish access to the toilet when the bed is down in the use postion, in spite of the fact that the extended bed outline area closely approaches the total area of the room.

Another object is to provide access to both the toilet and entrance door of the room when the bed is down in the use position. This arrangement provides that the bed may be raised or lowered or the door may be opened and closed by a person standing in the bedroom.

Another object is to provide convenient access to other facilities in the room, such as a wash basin and clothes closet, along with access to the toilet and door, while the bed is down.

The above and other objects of the invention will be apparent from the following description of certain exemplary embodiments, reference being made to the accompanying drawings, wherein.

Figure 1:
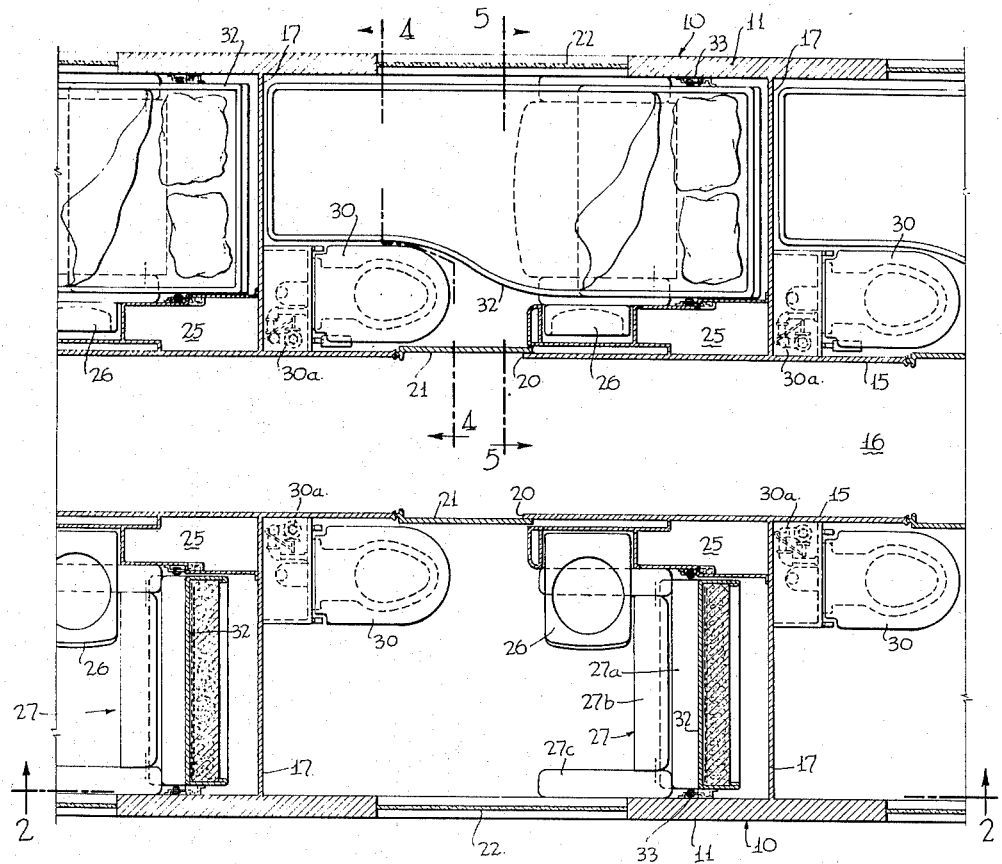
Fig. 1 is a sectional plan view of a portion of a railway bedroom car embodying the invention, the bed being shown down in the use position on one side of a center aisle and in raised stowed position on the other side of the aisle.

The present invention may be considered as an improvement upon the invention disclosed in my patent 2,546,134, March 20, 1951. The patent discloses an arrangement in which a rigid foldable bed, which occupies most of the area of the room, is cut out on one side from the lower end to permit the room occupant to stand on the floor in the doorway while raising or lowering the bed or opening or closing the door.

The patented arrangement was an improvement over other arrangements which were being used; but it, like the others, failed to provide access to the toilet while the bed was down in the use position. In most arrangements, the wash basin, likewise, was unavailable when the bed was down.

Of course, if space was unlimited, there would be no problem in providing access to the toilet and, indeed, there would be no need to use a foldable bed; but in railway cars, space is highly valuable and a car must accommodate a certain number of occupants for which its class rate is set or there will be a loss in operating the car.

The present invention relates especially to that class of accommodation for which a rate was set upon the accommodation of not less than 18 sleeping compartment passengers in an 85 ft. car. In my patented arrangement, there were comfortable room and bed accommodations for 22 persons in a standard 85 ft. car. Likewise, the present invention provides arrangements for accommodating 22 persons in a standard car. This means that, with thin transverse walls and with rooms on each side of a center aisle, each room has a gross plan size of about 76" x 43", and the bottom of the bed frame is about 24" from the floor. The entrance door is at least 18" wide in the clear. A toilet is about 15" high from the floor to the top of the seat and the seat is about 20" long. A fixed toilet with equipment is about 24" to 28" long from the wall. A combination foldable toilet and wash basin, known as a "Combolet" takes somewhat less space from the wall than the fixed toilet when the toilet is folded and about the same as the fixed toilet or slightly more when the toilet is extended for use.

In the illustrated embodiment a car 10, having outer side walls 11, a roof 13, and a floor 14, is provided with longitudinally extending rooms on each side of the walls 15 of a center aisle 16. On each side of the center aisle 16 in Fig. 1 there is shown one full length room and portions of two adjacent rooms separated by transverse partition walls 17.

The rooms shown in the upper part of Fig. 1 are arranged for sleeping occupancy, with the beds down, and the rooms shown at the bottom of Fig. 1 are arranged for day use except that the seat cushion is folded up to provide access to the basin, which is pulled out for use.

A doorway 20 in the aisle wall is provided with a sliding door 21. In the present arrangement this doorway is located near the center of the length of the room. There is a window 22 in the outer wall, the sill of the window preferably being above the bottom of the bed when the bed is down.

Within the room there is provided a wardrobe 25 having a door in the side or end, a folding wash basin 26, and a chair 27 having a back 27a which folds down, a seat 27b which folds up, and arms 27c. A toilet 30 is shown at one side of the doorway, its piping and other service appurtenances 30a being shown on the transverse partition wall behind it.

Behind the chair there is mounted a rigid bed frame 32 which is movable, as about hinge pins 33, between a stowed vertical position in a recessed space at the transverse partition wall and a horizontal use position. Suitable means, not shown, are provided for supporting the lower end of the bed when it is down and for latching it in the lowered and stowed positions.

It is the special feature of the present invention that the bed frame is recessed or cut away on the side adjacent the door and toilet for a width to allow seat space on the toilet, and the recess extends up far enough from the bottom end to provide knee room in front of the toilet and standing room in front of the toilet for raising and lowering the bed and for opening and closing the door. The bed is located at such height as to partly provide knee and leg space beneath the edge of the bed.

The bed at its upper end is substantially the full width of the room between the basin and wardrobe cabinet and the side wall of the car. The bed continues full width from the head end down to the edge of the door opening, which is full hip-length of the occupant, and then narrows gradually in a smooth curve to the narrowed lower end portion. The lower end still provides a width (24"

or more) for comfort of the legs below the hips and the feet. The narrow lower end portion extends up approximately to a point which is even with the front edge of the toilet. The bed is approximately the full length of the room. By the expression "full length" is meant the usable length in that no standing or sitting space for an occupant is left at either end of the bed. Room and bed length may vary somewhat from the illustrative dimensions given above, and the bed length may not always fit the room length as closely as shown herein.

Figure 2:
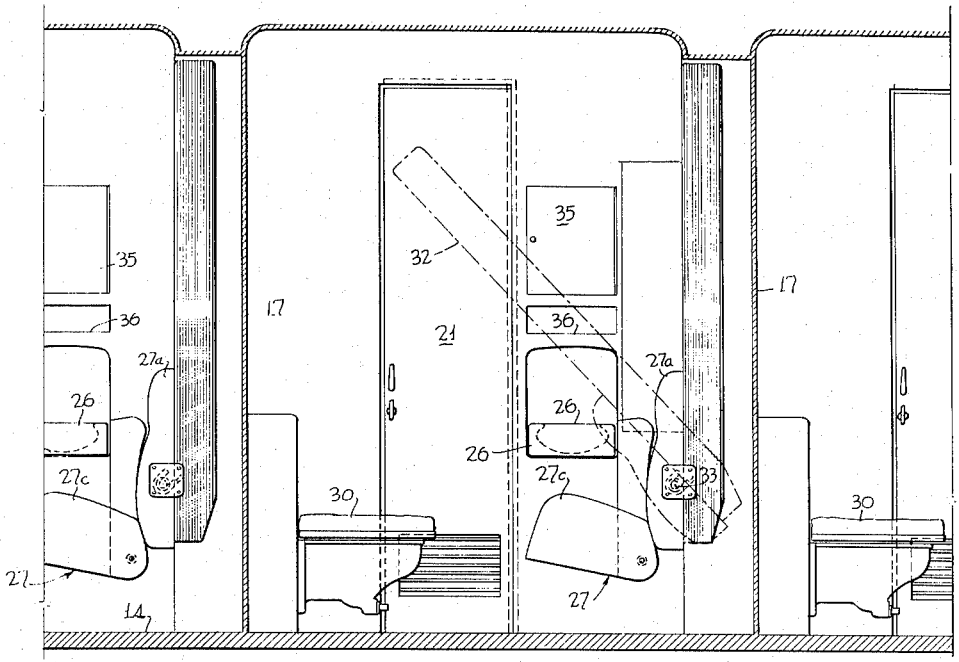
Fig. 2 is a vertical longitudinal section and elevation taken on the line 2—2 of Fig. 1, the bed being shown fully stowed in full lines and partly out in broken lines.
Figure 3:
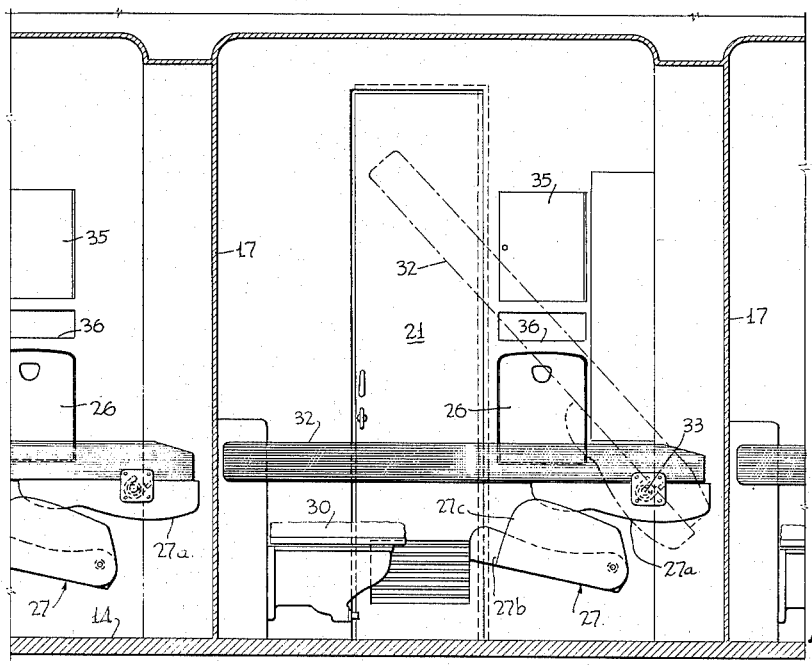
Fig. 3 is a view similar to Fig. 2, but showing the bed in full lines in the down position for use and in dotted lines in the partly raised position.
Figure 4:
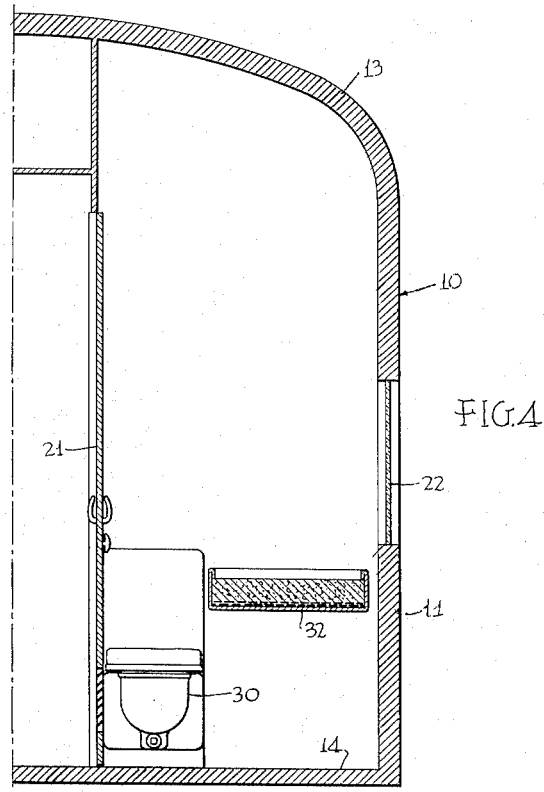
Fig. 4 is a vertical transverse section and elevation taken on the line 4—4 of Fig. 1.
Figure 5:
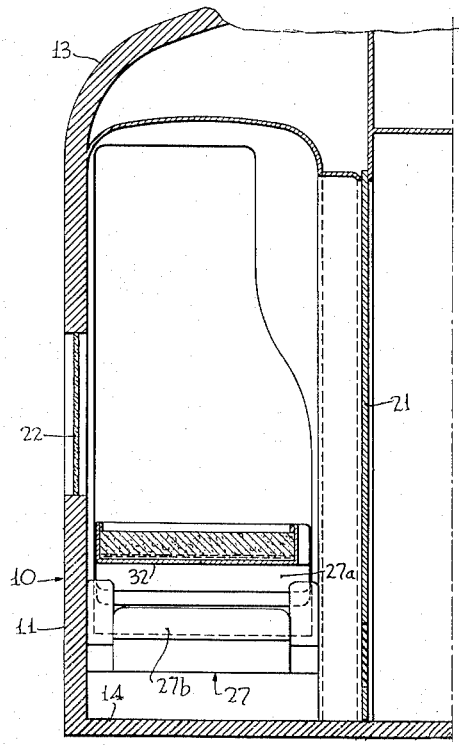
Fig. 5 is a vertical transverse section and elevation taken on the line 5—5 of Fig. 1.

There may be a cabinet 35 and a recessed shelf space 36 above the basin, as shown in Figs. 2 and 3.

Figure 6:
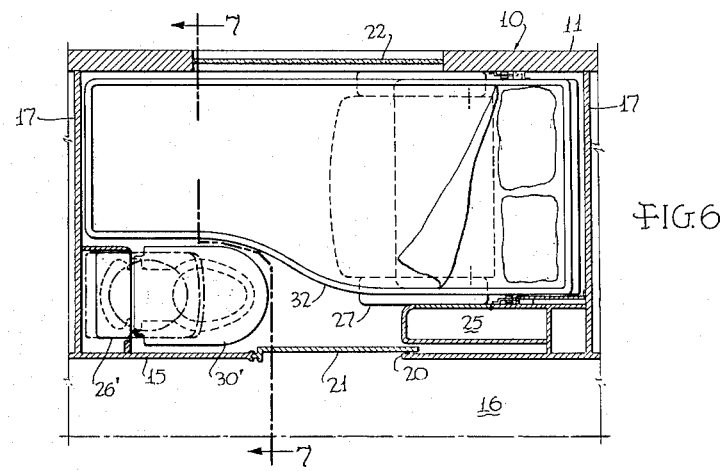
Fig. 6 is a partial section and plan of a bedoom car showing a modification, the view being taken on the line 6—6 of Fig. 7.
Figure 7:
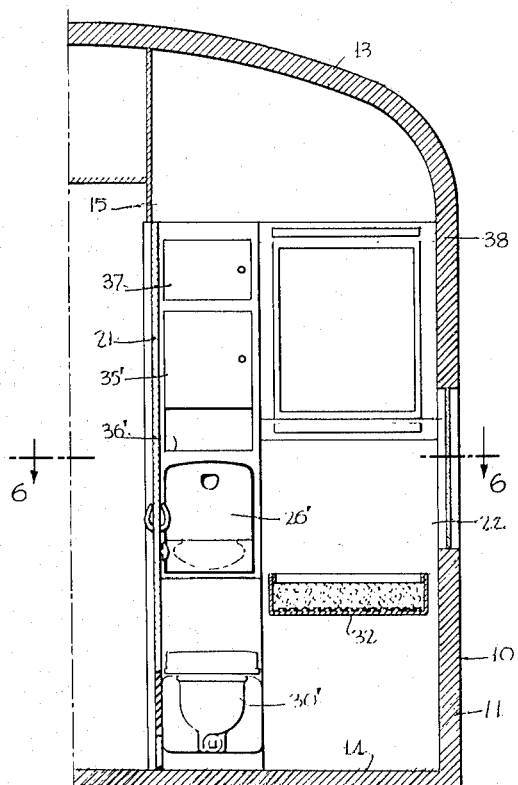
Fig. 7 is a transverse vertical section and elevation taken on the line 7—7 of Fig. 6.

The embodiment shown in Figs. 6 and 7 is very similar to that already described and, as far as applicable, the same reference characters will be used.

In the modification the main difference is that the toilet and basin are combined in a "Combolet," or the like, in which the toilet 30' is hinged to fold up when not in use to provide more standing space and the basin 26' is mounted to fold up above the toilet. The wardrobe 25' may be made wider and if it has a front door, instead of an end door, this may be made wider. The main doorway 20 may also be made wider.

In Fig. 7 there is shown a cabinet 35', a shelf 36', another compartment 37 (which may be a shoe box), and a mirror 38 with lamps and service outlets.

The bed dimensions and shape are about the same in each embodiment.

In both embodiments it will be noted that the basin and toilet, the only facilities requiring plumbing, are located on the aisle wall side where the piping can be serviced from an opening cut in the aisle wall and normally covered by a closure. In addition to providing access without disturbing the room occupant, this disposes the piping toward the middle of the car where it will be better protected from freezing in cold weather.

While certain embodiments of the invention have been disclosed for the purpose of illustration, it is to be understood that there may be other embodiments within the general scope of the invention.

What is claimed is:

1. In a vehicle such as a railway sleeping car having longitudinal side walls and a longitudinal aisle with rooms on at least one side thereof, a room defined by a side wall, an aisle wall, and longitudinally spaced transverse walls, a toilet in one corner of said room requiring standing space and sitting knee space in front thereof, said toilet facing the long way in said room, a doorway in said aisle wall leading into said room forward of said toilet, a door in said doorway, a rigid-framed bed mounted in said room for movement between a stowed position and a horizontal use position, said bed being arranged in use with its longer dimension disposed in the direction of the length of the room, the bed also being of such length and width in relation to the length and width of the room that a side and an end thereof, if extended, would meet in the vertically projected space through said toilet, the side of said bed being cut away from one end for such distance along the side as to leave the vertical space through said toilet and the full width of the toilet for at least standing space distance in front thereof flanking the door opening clear for use of the toilet when the bed is down in the use position and for manipulation of the bed, and a folding basin in the room which in the folded position stands clear of the bed, the long part of the bed in the down position for use occupying substantialy the full length of the room from one partition wall to the other and the room being free from utility compartment space at both ends, whereby the length of a plurality of rooms is substantially equal to the length of a like number of beds plus the partition thicknesses and the clearance space needed to operate the beds.

2. In a vehicle such as a railway sleeping car having longitudinal side walls and a longitudinal aisle with rooms on at least one side thereof, a room defined by a side wall, an aisle wall, and longitudinally spaced transverse walls, a toilet in one corner of said room requiring sitting knee space in front thereof, said toilet facing the long way in said room, a rigid foldable bed mounted in said room for movement between a stowed position and a horizontal use position, the bed in its use position being arranged with its longer dimension disposed in the direction of the length of the room, the bed also having one side and an end of such dimensions that the bed if made as a full rectangle on the same dimensions would not permit sitting space at said toilet, said bed being cut away from one end at one side to clear the vertically projected space of said toilet and a space in front thereof of the same width for a sufficient distance to provide full sitting space at said toilet, a door in a wall adjacent and immediately forward of said toilet, the space in front of the toilet providing access for the full width of the cut-out flanking at least part of the door opening for reaching the door to operate it and for moving the bed between the stowed and use positions, and a folding basin in the room which in the folded position stands clear of the bed, the long part of the bed in the down position for use occupying substantially the full length of the room from one partition wall to the other and the room being free from utility compartment space at both ends, whereby the length of a plurality of rooms is substantially equal to the length of a like number of beds plus the partition thicknesses and the clearance space needed to operate the beds.

3. In a vehicle such as a railway sleeping car having longitudinal side walls and a longitudinal aisle with rooms on at least one side thereof, a rectangular room defined by a side wall, an aisle wall, and longitudinally spaced transverse walls, a toilet in one corner of the room at the aisle wall side and facing along the length of the room, said toilet requiring sitting knee space in front thereof, a doorway and door in the aisle wall at the front of the toilet, a rigid foldable bed in the room which if made as a full rectangle of its greatest side and end dimensions would, in its horizontal use position, prevent the use of the toilet in sitting position and prevent standing in front of the toilet, said bed being cut out from the toilet end along the side for sufficient width and length to leave the toilet and a full-width knee-length space in front of it clear to accommodate the knees when sitting, the cut-out extending full width to flank at least part of the door opening and having some reduction in width for substantially the full door width, to provide standing space to permit manipulation of the folding bed, and to provide standing space for operating the door, and a folding basin in the room which in the folded position stands clear of the bed, the long part of the bed in the down position for use occupying substantially the full length of the room from one partition wall to the other and the room being free from utility compartment space at both ends, whereby the length of a plurality of rooms is substantially equal to the length of a like number of beds plus the partition thicknesses and the clearance space needed to operate the beds.

4. The combination set forth in claim 3 which further comprises, a basin located at the partition wall above the toilet, and a wardrobe located on the aisle wall alongside the wide end of the bed.

5. The combination as set forth in claim 3 which further comprises, a basin and wardrobe located on the aisle wall alongside the wide end of the bed.

6. In a vehicle such as a railway sleeping car having longitudinal side walls and aisle walls with rooms on each side, a rectangular room defined by a side wall, aisle wall, and longitudinally spaced transverse walls interconnecting said side and aisle walls, a rigid fixed-length movable bed in said room which in the horizontal use position is of such length that it occupies substantially all of the useable length of the room, and is of such width at one end that it occupies almost all of the useable width of the room at that end, a toilet hopper mounted adjacent the aisle wall and the other end of the room and facing toward the said one end of the room, a doorway and door in the aisle wall in front of the hopper, said bed having a cut-out recess on the side toward the aisle wall opposite the hopper and doorway to leave the useable width of the hopper and the full-width space in front of it at the door clear for sitting knee room in front of the hopper, for standing room in front of the hopper and doorway when the door is closed, and for moving the bed between the stowed and use positions, and a folding basin in the room which in the folded position stands clear of the bed, the long part of the bed in the down position for use occupying substantially the full length of the room from one partition wall to the other and the room being free from utility compartment space at both ends, whereby the length of a plurality of rooms is substantially equal to the length of a like number of beds plus the partition thicknesses and the clearance space needed to operate the beds.

7. In a vehicle such as a railway sleeping car having longitudinal side walls and aisle walls with rooms on each side, a rectangular room having a side wall, an aisle wall, and longitudinally spaced transverse walls interconnecting said side and aisle walls, a rigid fixed-length movable bed in said room which in the horizontal use position is of such length that it occupies practically all of the useable length of the room, and is of such width at one end that it occupies practically all of the useable width of the room at that end, a toilet hopper mounted adjacent the aisle wall and the other end of the room and facing toward the said one end of the room, said aisle wall having a doorway and door at a position forward of the hopper, said bed having a cut-out recess on the side toward the aisle wall opposite the hopper and doorway to leave the useable width of the hopper and the same width space in front of it at the door clear for the knees when sitting and to provide standing room inside said door when closed in the doorway, the bed in its use position being disposed above knee height of normal persons when sitting, and a folding basin in the room which in the folded position stands clear of the bed, the long part of the bed in the down position for use occupying substantially the full length of the room from one partition wall to the other and the room being free from utility compartment space at both ends, whereby the length of a plurality of rooms is substantially equal to the length of a like number of beds plus the partition thicknesses and the clearance space needed to operate the beds.

References Cited in the file of this patent

UNITED STATES PATENTS

| | | |
|---|---|---|
| 2,143,827 | Demarest | Jan. 10, 1939 |
| 2,147,011 | Crawford | Feb. 14, 1939 |